UNITED STATES PATENT OFFICE.

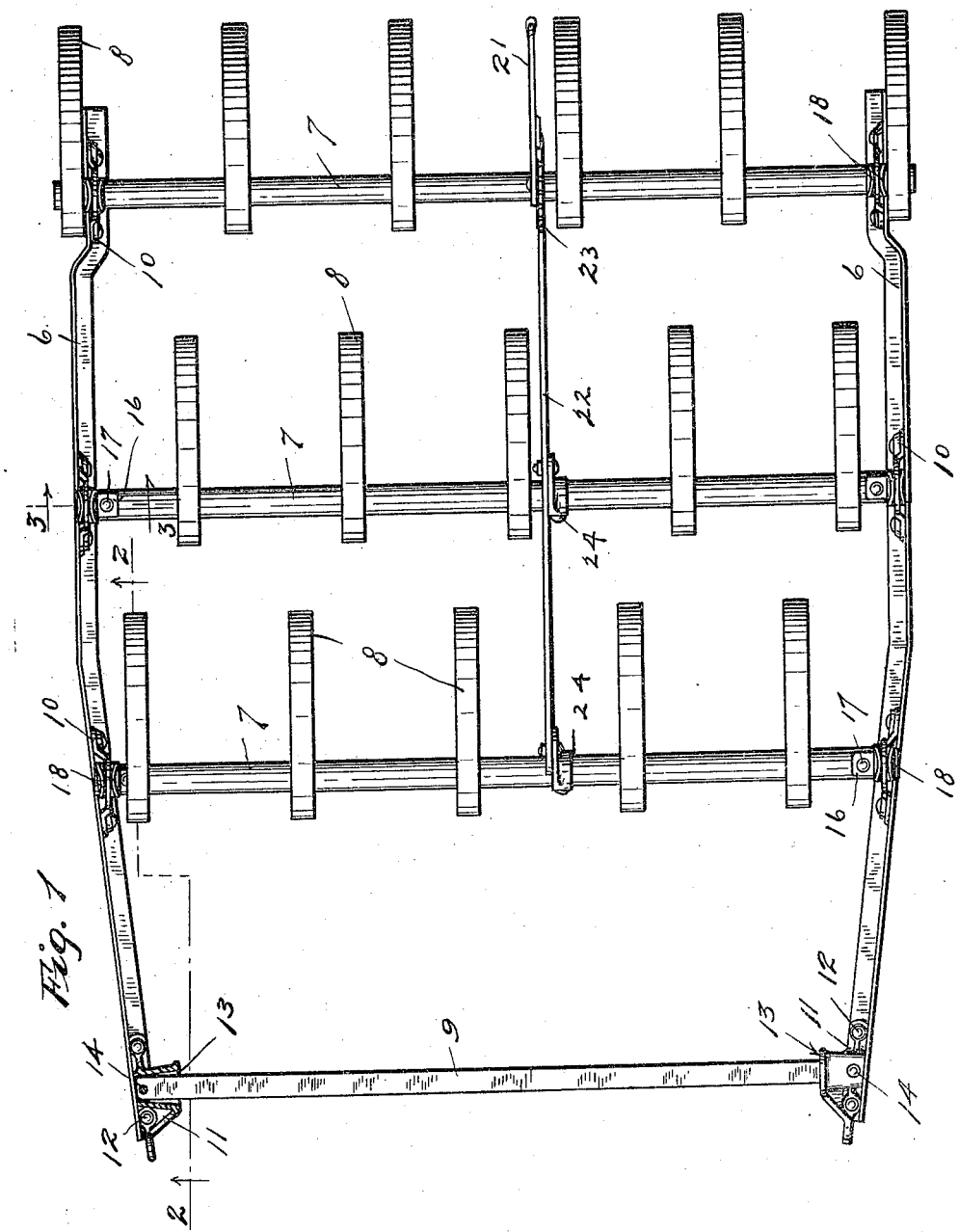

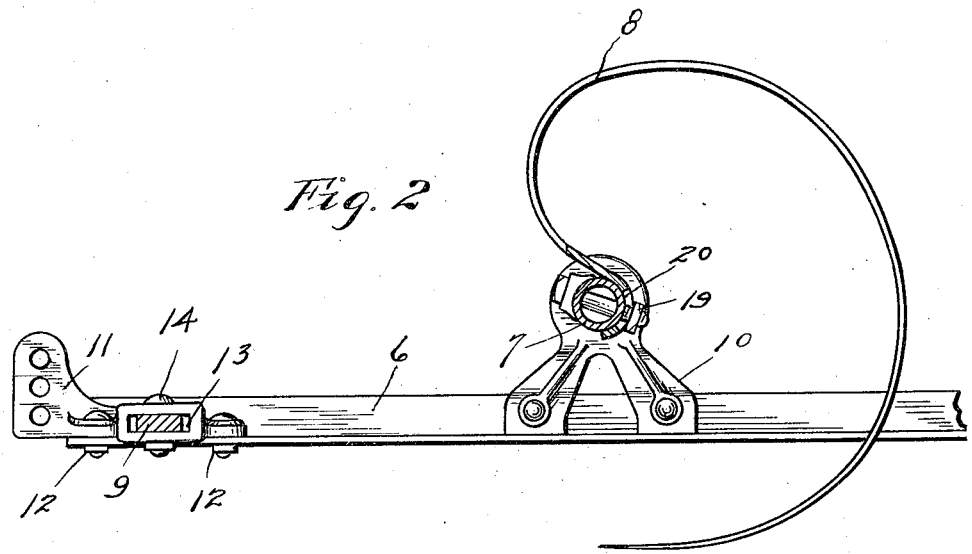
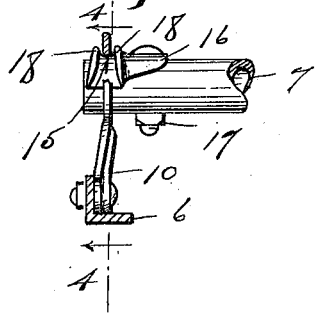
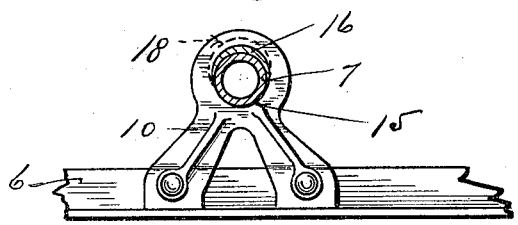
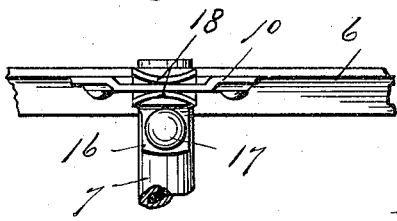

JOSEPH J. KOVAR, OF OWATONNA, MINNESOTA.

SPRING-TOOTHED HARROW.

1,298,735. Specification of Letters Patent. Patented Apr. 1, 1919.

Application filed May 13, 1918. Serial No. 234,066.

*To all whom it may concern:*

Be it known that I, JOSEPH J. KOVAR, a citizen of the United States, residing at Owatonna, in the county of Steele and State of Minnesota, have invented certain new and useful Improvements in Spring-Toothed Harrows; and I do hereby declare the following to be a full, clear, and exact description of the invention, such as will enable others skilled in the art to which it appertains to make and use the same.

My present invention relates to improvements in harrows and is in the nature of an improvement on my two U. S. Letters Patents, of the same title, No. 1,170,761, issued February 8, 1916, and No. 1,266,489, issued May 14, 1918.

To the above end, generally stated, the invention consists of the novel devices and combinations of devices hereinafter described and defined in the claims.

In the accompanying drawings, which illustrate the invention, like characters indicate like parts throughout the several views.

Referring to the drawings,

Figure 1 is a plan view of one of the sections or units of the improved harrow;

Fig. 2 is a detail view, partly in elevation and partly in vertical section, taken on the irregular line 2—2 of Fig. 1, on an enlarged scale;

Fig. 3 is a detail view, with some parts sectioned on the line 3—3 of Figure 1, on an enlarged scale;

Fig. 4 is a detail view, with some parts sectioned on the line 4—4 of Fig. 3; and Fig. 5 is a plan view of the parts shown in Figs. 3 and 4.

The improved harrow is adapted to be made in any desired number of sections or units, but, for the purpose of this case, the illustration of a single section will suffice, as the said sections are substantially alike. Each section of the improved harrow comprises a pair of laterally spaced forwardly and rearwardly extended draw bars 6, a plurality of transverse tubular rock shafts 7, a plurality of spring harrow teeth 8, and a cross tie-bar 9. The rock shafts 7 are flexibly connected to the drag bars 6 by brackets 10 and likewise the cross tie bar is connected to the front ends of the drag bars 6 by clevis brackets 11.

Preferably, as shown, the drag bars 6 are made from commercial angle bars, the horizontal flanges of which are turned toward each other and the vertical flanges of which are turned upward. The forward portions of the drag bars 6 converge from a point between the front and intermediate rock shafts 7 and the rear portions thereof are parallel. The clevis brackets 11 rest upon the horizontal flanges of the drag bars 6 and are rigidly secured thereto by nut-equipped bolts 12.

Formed in the clevis brackets 11, are horizontally disposed sockets or pockets 13 to receive the ends of the cross tie-bar 9, which are secured therein by vertical nut-equipped pivot bolts 14. These sockets or pockets 13 have flaring vertical side walls, which permit a limited horizontal movement of the cross tie bar 9 on their pivot bolts 14, with respect to the drag bars 6.

The brackets 10 are riveted or otherwise rigidly secured to the inner faces of the vertical flanges of the drag bars 6. In the upper ends of the brackets 10, are relatively large bearing eyes 15, into which the ends of the rock shafts 7 are loosely telescoped.

Saddle plates 16 hold the rock shafts 7 against endwise movement in the bearing eyes 15, but with freedom for rotary movement and to assume different vertical and horizontal positions, in respect to the drag bars 6. Each of these saddle plates 16 is segmental in cross section, rests directly on the respective rock shaft 7, and is rigidly but detachably secured thereto by a nut-equipped bolt 17. The saddle plates 16 extend through the bearing eyes 15 of the bracket 10 and have integrally formed upwardly projecting pairs of laterally spaced flanges 18. At the longitudinal centers of the saddle plates 16, these flanges closely embrace the vertical walls of the brackets 10, above the bearing eyes 15, and prevent endwise movement of the rock shafts 7 in said bearing eyes. From the longitudinal centers of the saddle brackets 16, the flanges 18 diverge in opposite directions to permit both vertical and horizontal angular movements of the rock shafts 7, with respect to the drag bars 6.

In securing the rock shafts 7 to the brackets 10, the saddle plates 16 are first inserted through the bearing eyes 15 and held with their flanges 18 interlocked with said brackets; next, the ends of the rock shafts 7 are telescoped through the bearing eyes 15 and under the saddle plates 16; and finally, the bolts 17 are passed through the alined holes in said saddle plates and rock shafts to hold the several parts in assembled relation.

The harrow teeth 8, which are fully described and broadly claimed in my above identified application, are rigidly secured to the rock shafts 7, with freedom for a limited circumferential adjustment thereon by nut-equipped bolts 19 passed through alined perforations in the rock shafts 7 and longitudinally extended slots 20 formed in said teeth. All of the teeth 8 are secured to the rock shafts 7 by the bolts 19, with the exception of the two outer ones on the rear rock shaft. These two teeth 8 and the adjacent saddle plates 16, which are turned in opposite directions from the others of said saddle plates, are secured to the respective rock shaft by the same bolts.

To keep the harrow sections in compact form and also prevent any of the parts from projecting materially outward of the drag bars 6, the rear ends of said drag bars are offset inward to permit the two outer teeth 8, on the rear rock shaft, to be substantially alined with said drag bars.

To lift the points of the teeth 8 out of the ground, or set the same variable distances into the ground, the rock shafts 7 are simultaneously oscillated by a latch lever 21 and operating bar 22. The latch lever 21 is pivoted to a coöperating lock segment 23 rigidly secured to the rear rock shaft 7. The rear end of the operating bar 22 is pivoted to said lever and, on the other rock shafts 7, are arms 24, to the outer ends of which is pivoted said bar.

Suitable draft connections, not shown, will be secured by clevises to the clevis brackets 11.

What I claim is:—

1. A harrow including a drag bar having a bracket with a bearing eye, a tooth-equipped rock shaft inserted through said bearing eye, and a lock engageable with opposite sides of the bracket for securing the rock shaft to the bracket against endwise movement, but with freedom for horizontal and vertical angular movements with respect to said drag bar.

2. A harrow including a drag bar having a bracket with a bearing eye, a tooth-equipped rock shaft inserted through said bearing eye, and a saddle plate detachably secured to said rock shaft and having interlocking engagement with opposite sides of said bracket to prevent endwise movement of said rock shaft with respect to the drag bar, but permitting vertical and horizontal angular movements with respect thereto.

3. A harrow including a drag bar having a bracket with a bearing eye, a tooth-equipped rock shaft telescoped through said bearing eye, a saddle plate, and means for detachably securing said saddle plate to the rock shaft, said saddle plate having a pair of laterally spaced forwardly and rearwardly diverging flanges embracing said bracket for holding the rock shaft against endwise movement with respect to the drag bar, but permitting horizontal and vertical angular movements thereof.

In testimony whereof I affix my signature in presence of two witnesses.

JOSEPH J. KOVAR.

Witnesses:
 G. B. BENNETT,
 ROSE RIERSON.

Copies of this patent may be obtained for five cents each, by addressing the "Commissioner of Patents, Washington, D. C."